US011411982B2

(12) United States Patent
Velugu et al.

(10) Patent No.: US 11,411,982 B2
(45) Date of Patent: Aug. 9, 2022

(54) SYSTEMS AND METHODS FOR GRAPHICAL VISUALIZATION OF WEB APPLICATION VULNERABILITIES

(71) Applicant: Citrix Systems, Inc., Ft. Lauderdale, FL (US)

(72) Inventors: Kasirao Velugu, Bangalore (IN); Priya Bagaria, Kolkata (IN); Thirumoorthi Thangamani, Bangalore (IN); Ganesh Kathiresan, Bangalore (IN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 39 days.

(21) Appl. No.: 17/034,636

(22) Filed: Sep. 28, 2020

(65) Prior Publication Data
US 2022/0103587 A1  Mar. 31, 2022

(51) Int. Cl.
*H04L 9/40* (2022.01)
*H04L 41/22* (2022.01)

(52) U.S. Cl.
CPC .......... *H04L 63/1433* (2013.01); *H04L 41/22* (2013.01); *H04L 63/0236* (2013.01); *H04L 63/1416* (2013.01); *H04L 63/20* (2013.01)

(58) Field of Classification Search
CPC ............. H04L 63/1433; H04L 63/0236; H04L 63/1416; H04L 63/20
USPC ........................................ 726/22, 23, 24, 25
See application file for complete search history.

(56) References Cited

U.S. PATENT DOCUMENTS

| 10,237,283 B2* | 3/2019 | Zhang ................. H04L 63/1416 |
| 2010/0325588 A1* | 12/2010 | Reddy ................. H04L 63/0263 715/853 |
| 2012/0180133 A1* | 7/2012 | Al-Harbi ............. H04L 63/1433 726/25 |
| 2014/0283080 A1* | 9/2014 | Beskrovny ............ G06F 21/577 726/25 |
| 2015/0319181 A1* | 11/2015 | Rao .......................... G06F 8/70 726/23 |

(Continued)

OTHER PUBLICATIONS

"sqlmapproject / sqlmap", retreived from the Internet: https://github.com/sqlmapproject/sqlmap [retrieved Sep. 25, 2020], 5 pges.

*Primary Examiner* — Teshome Hailu
(74) *Attorney, Agent, or Firm* — Finch & Maloney PLLC (57) ABSTRACT

A computer system is provided. The computer system includes a memory and at least one processor coupled to the memory and configured to extract, from a website vulnerability scanner log, a uniform resource locator (URL) and a vulnerability score and vulnerability classification associated with the URL. The at least one processor is further configured to generate an application vulnerability graph comprising connected nodes that are associated with a field of the URL. The nodes are labeled to indicate the associated field of the URL and color coded based on the vulnerability score. The nodes are also associated with the vulnerability classification. The at least one processor is further configured to enable or disable security protection against a user-selected vulnerability classification of a user-selected node by generating web application firewall security rules and/or web application firewall relaxation rules.

15 Claims, 10 Drawing Sheets
(3 of 10 Drawing Sheet(s) Filed in Color)

(56) References Cited

U.S. PATENT DOCUMENTS

| | | | |
|---|---|---|---|
| 2015/0319184 A1* | 11/2015 | Lee | H04L 63/1441 |
| | | | 726/22 |
| 2015/0347751 A1* | 12/2015 | Card | H04L 63/20 |
| | | | 726/23 |
| 2018/0041521 A1* | 2/2018 | Zhang | H04L 63/14 |
| 2018/0046928 A1* | 2/2018 | Jang | H04L 63/1425 |
| 2018/0048661 A1* | 2/2018 | Bird | G06F 21/00 |
| 2018/0048662 A1* | 2/2018 | Jang | H04L 63/1416 |

\* cited by examiner

FIG. 1

```
Entry 1
200

{
"method": "POST",
"attack": "SQL",
"attack_type": "Error-based SQL Injection",
"patterns": [
   {
      "field_name": "login",
      "field_type": "LITERAL",
      "match_type": "Injection",
      "location": "HTTP_FORM_FIELD"
   }
],
"category": "SQL",
"url": "http://13.42.14.75/users/login",
"severity": "HIGH"
}
```

```
Entry 2
210
```

⋮

```
Entry N
220
```

Integration with Application Delivery Management (ADM) and Controller (ADC)
800

SYSTEMS AND METHODS FOR GRAPHICAL VISUALIZATION OF WEB APPLICATION VULNERABILITIES

BACKGROUND

A web application can include multiple web pages, Uniform Resource Locators (URLs), and Application Programming Interfaces (APIs). There are often numerous developers working on a given web application, and this can lead to confusion related to the structure and content of the application. Additionally, in the case of legacy applications, keeping track of URLs and APIs that are accessible from a web application can be cumbersome and often leads to the exposure of untracked URLs and APIs. Security vulnerabilities can thus arise and Web Application Firewall (WAF) rules or policies are created to handle these vulnerabilities. It can be tedious, however, to write these rules based on the results of existing vulnerability scanning tools.

SUMMARY

In at least one example, a computer system is provided. The computer system includes a memory; and at least one processor coupled to the memory and configured to: extract, from a website vulnerability scanner log file, a uniform resource locator (URL), a vulnerability score associated with the URL, and a vulnerability classification associated with the URL; and generate an application vulnerability graph comprising nodes connected by edges, wherein each node is associated with a field of the URL, the nodes are labeled to indicate the associated field of the URL, the nodes are color coded based on the vulnerability score, and the nodes are associated with the vulnerability classification.

At least some examples of the computer system can include one or more of the following features. The vulnerability classification comprises one or more of a Structured Query Language injection vulnerability, a Cross-site Scripting injection vulnerability, a credit card leak vulnerability, and a path traversal vulnerability. The at least one processor is further configured to filter nodes of the application vulnerability graph based on a match between a user-selected vulnerability classification and the vulnerability classification associated with the nodes. The at least one processor is further configured to enable or disable security protection against the user-selected vulnerability classification of the nodes. The at least one processor is further configured to generate web application firewall security rules and/or web application firewall relaxation rules for application to one or more user-selected nodes. The web application firewall security rules and the web application firewall relaxation rules are generated as regular expressions based on the URL. The at least one processor is further configured to: generate a first application vulnerability graph based on a first website vulnerability scanner log file provided at a first time; generate a second application vulnerability graph based on a second website vulnerability scanner log file provided at a second time; and render a visualization of differences between the first application vulnerability graph and the second application vulnerability graph.

In at least one example, a method for graphical visualization of web application vulnerabilities is provided. The method includes extracting, by a computer system, from a website vulnerability scanner log file, a uniform resource locator (URL), a vulnerability score associated with the URL, and a vulnerability classification associated with the URL; and generating, by the computer system, an application vulnerability graph comprising nodes connected by edges, wherein each node is associated with a field of the URL, the nodes are labeled to indicate the associated field of the URL, the nodes are color coded based on the vulnerability score, and the nodes are associated with the vulnerability classification.

At least some examples of the method can include one or more of the following features. The vulnerability classification comprises one or more of a Structured Query Language injection vulnerability, a Cross-site Scripting injection vulnerability, a credit card leak vulnerability, and a path traversal vulnerability. The act of filtering nodes of the application vulnerability graph based on a match between a user-selected vulnerability classification and the vulnerability classification associated with the nodes. The act of enabling or disabling security protection against the user-selected vulnerability classification of a user-selected node. The act of generating web application firewall security rules and/or web application firewall relaxation rules for application to one or more user-selected nodes. The web application firewall security rules and the web application firewall relaxation rules are generated as regular expressions based on the URL. The act of generating a first application vulnerability graph based on a first website vulnerability scanner log file provided at a first time; generating a second application vulnerability graph based on a second website vulnerability scanner log file provided at a second time; and rendering a visualization of differences between the first application vulnerability graph and the second application vulnerability graph.

In at least one example, a non-transitory computer readable medium storing executable sequences of instructions to provide graphical visualization of web application vulnerabilities is provided. The sequences of instructions include instructions to: extract, from a website vulnerability scanner log file, a uniform resource locator (URL), a vulnerability score associated with the URL, and a vulnerability classification associated with the URL; and generate an application vulnerability graph comprising nodes connected by edges, wherein each node is associated with a field of the URL, the nodes are labeled to indicate the associated field of the URL, the nodes are color coded based on the vulnerability score, and the nodes are associated with the vulnerability classification.

At least some examples of the non-transitory computer readable medium can include one or more of the following features. The vulnerability classification comprises one or more of a Structured Query Language injection vulnerability, a Cross-site Scripting injection vulnerability, a credit card leak vulnerability, and a path traversal vulnerability. Instructions to filter nodes of the application vulnerability graph based on a match between a user-selected vulnerability classification and the vulnerability classification associated with the nodes. Instructions to enable or disable security protection against the user-selected vulnerability classification of a user-selected node. Instructions to generate web application firewall security rules and/or web application firewall relaxation rules for application to one or more user-selected nodes. The web application firewall security rules and the web application firewall relaxation rules are generated as regular expressions based on the URL. Instructions to: generate a first application vulnerability graph based on a first website vulnerability scanner log file provided at a first time; generate a second application vulnerability graph based on a second website vulnerability scanner log file provided at a second time; and render a visualization of differences between the first application vulnerability graph and the second application vulnerability graph.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

As noted previously, web applications are often susceptible to security vulnerabilities. Vulnerability scanners exist which can, for example, traverse through numerous web sites (e.g., crawl the web) and detect vulnerabilities in the server that are encountered during the crawl. These web application scanners generate lists or logs of the detected vulnerabilities, but the logs fail to provide an illustration of the security issues with respect to website structure in a format that is easy to comprehend and work with. It can therefore be tedious and inefficient to write Web Application Firewall (WAF) rules or policies, to implement protective measures, directly from the scanner results.

To address these problems, and as summarized above, various examples described herein are directed to systems and methods for graphical visualization of web application vulnerabilities and the use of such graphical visualization to configure rules and policies to provide protection against those vulnerabilities. In some examples, the systems and methods generate an application vulnerability graph based on the results of a web scanner. The graph provides a visual representation of server-side web application structures along with the discovered vulnerabilities (e.g., in the exposed server-side URLs and APIs) in the context of those structures.

In some examples, the application vulnerability graph may be a Directed Acyclic Graph (DAG), also known as a tree graph, comprising nodes (e.g., a root node, intermediate nodes, and leaf nodes) connected by edges. Based on the results of the web application scanner, applications belonging to a domain are represented as a DAG. The host name of the web application is represented by the root node of the DAG and each URL/API is represented in the graph as a root-to-leaf traversal. The URL/API path is split by the separator '/' as a list of strings. Each string in this list is represented as a node in the graph. The nodes are connected by directed edges in such a way that the string in a node is the parent of the string to its right in the list, and the child of the string to its left in the list, as will be illustrated and explained in greater detail below. As an example, for the URL "http://www.company.com/a/b/c", the root of the tree is www.company.com, and the path to represent the URL is root->/a->/b->/c.

In some examples, each node may be color-coded to indicate the vulnerability severity associated with that node, for easy recognition by the user/viewer of the graph. In some examples, additional data or metadata associated with the node (including vulnerability classification) may be displayed in a relatively efficient manner such as, for example, when the user hovers a mouse or other pointing device over the displayed node.

In some examples, the nodes of the application vulnerability graph may be filtered based on user-selected vulnerability classifications of interest. Additionally, the systems and methods may provide the capability for the user to enable or disable security protection against selected vulnerability classifications associated with selected nodes. WAF security rules and policies may then be generated based on the desired enabled/disable security protections.

In some examples, application vulnerability graphs can be generated for multiple instances of web scanner logs that are provided over various time periods. In these examples, a visualization of the differences between the graphs may be rendered to provide a convenient visual identification of the changes that have taken place over time.

As will be understood in view of this disclosure, the systems and methods for graphical visualization of web application vulnerabilities for use in configuring protection policies provided herein have several advantages over existing methods which fail to provide an illustration of the security issues with respect to website structure in a format that is easy to comprehend and work with.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Visualization System

Figure 1:
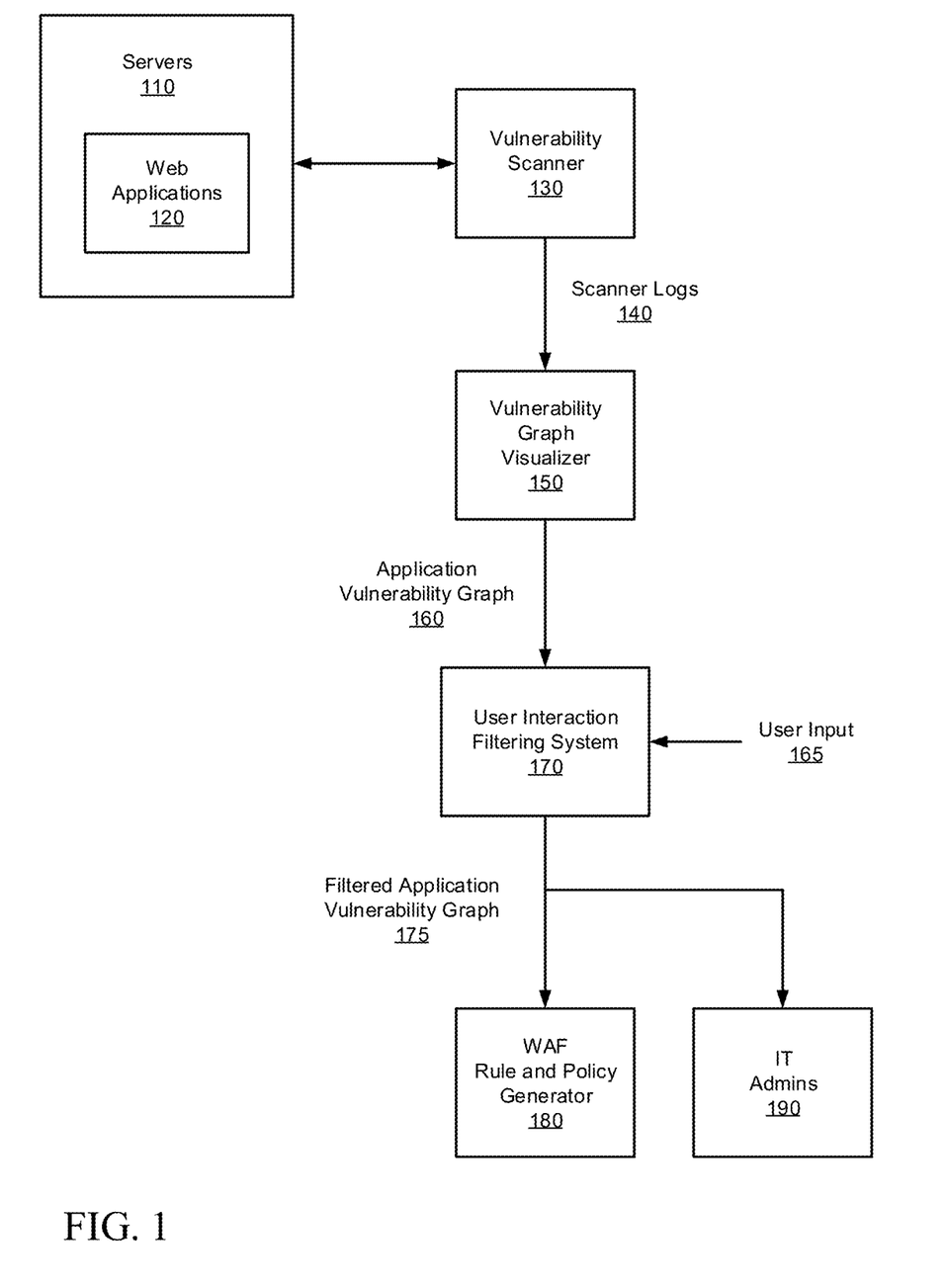
FIG. 1 is a top-level block diagram of an implementation of a system for providing graphical visualization of web site vulnerabilities for use in configuring protection policies, in accordance with an example of the present disclosure.

FIG. 1 is a top-level block diagram 100 of an implementation of a system for providing graphical visualization of web site vulnerabilities for use in configuring protection policies, in accordance with an example of the present disclosure. As shown in FIG. 1, the system includes a vulnerability scanner 130, a vulnerability graph visualizer 150, a user interaction filtering system 170, and a WAF rule and policy generator 180.

Figure 2:
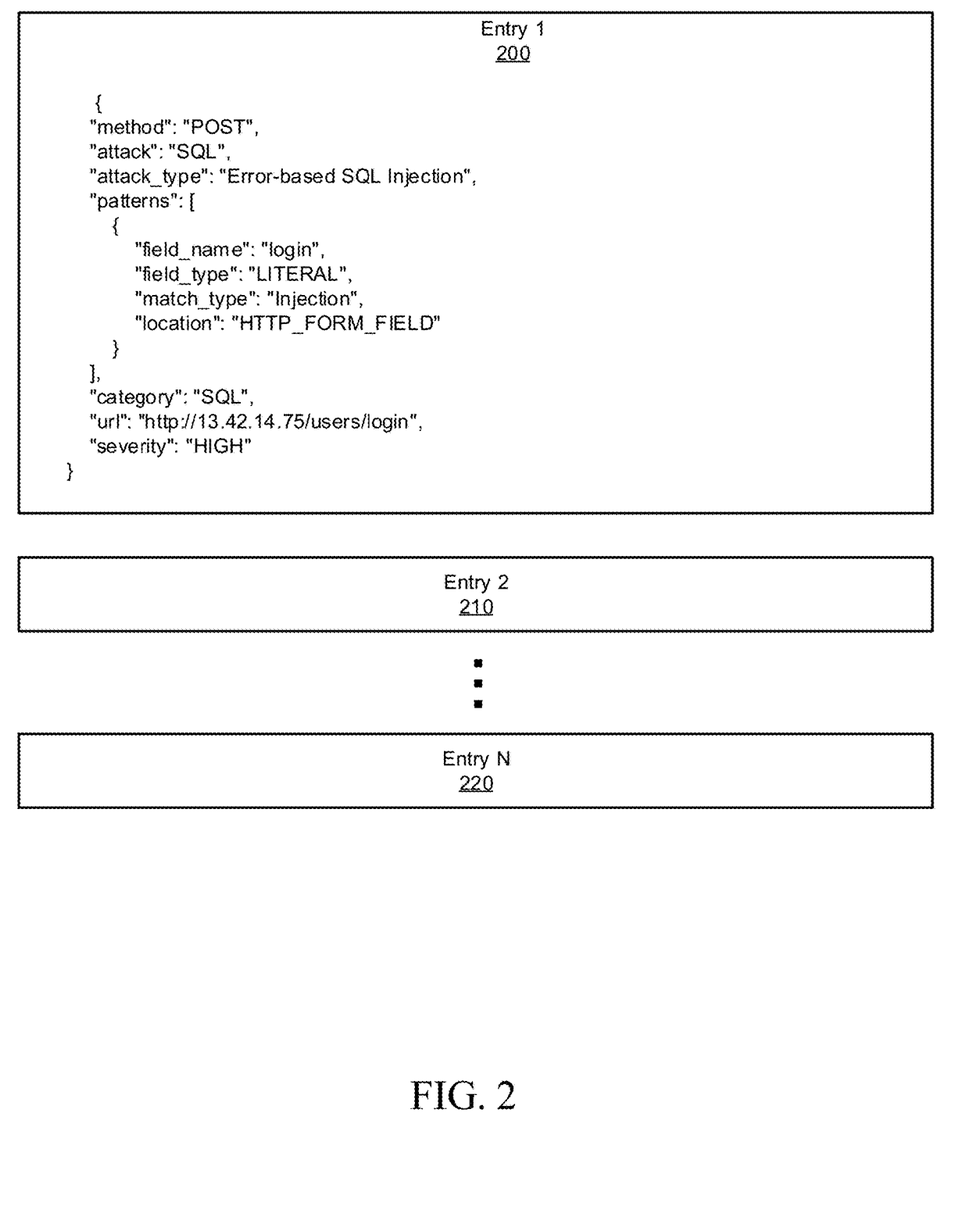
FIG. 2 illustrates a vulnerability scanner log, in accordance with an example of the present disclosure.

The vulnerability scanner 130 is configured to traverse servers 110 and the web sites hosted on those servers, detect vulnerabilities in the web applications 120 associated with those websites, and generate scanner logs 140 providing details of the detected vulnerabilities. An example of one such scanner log is shown in FIG. 2 and will be discussed below.

Figure 3:
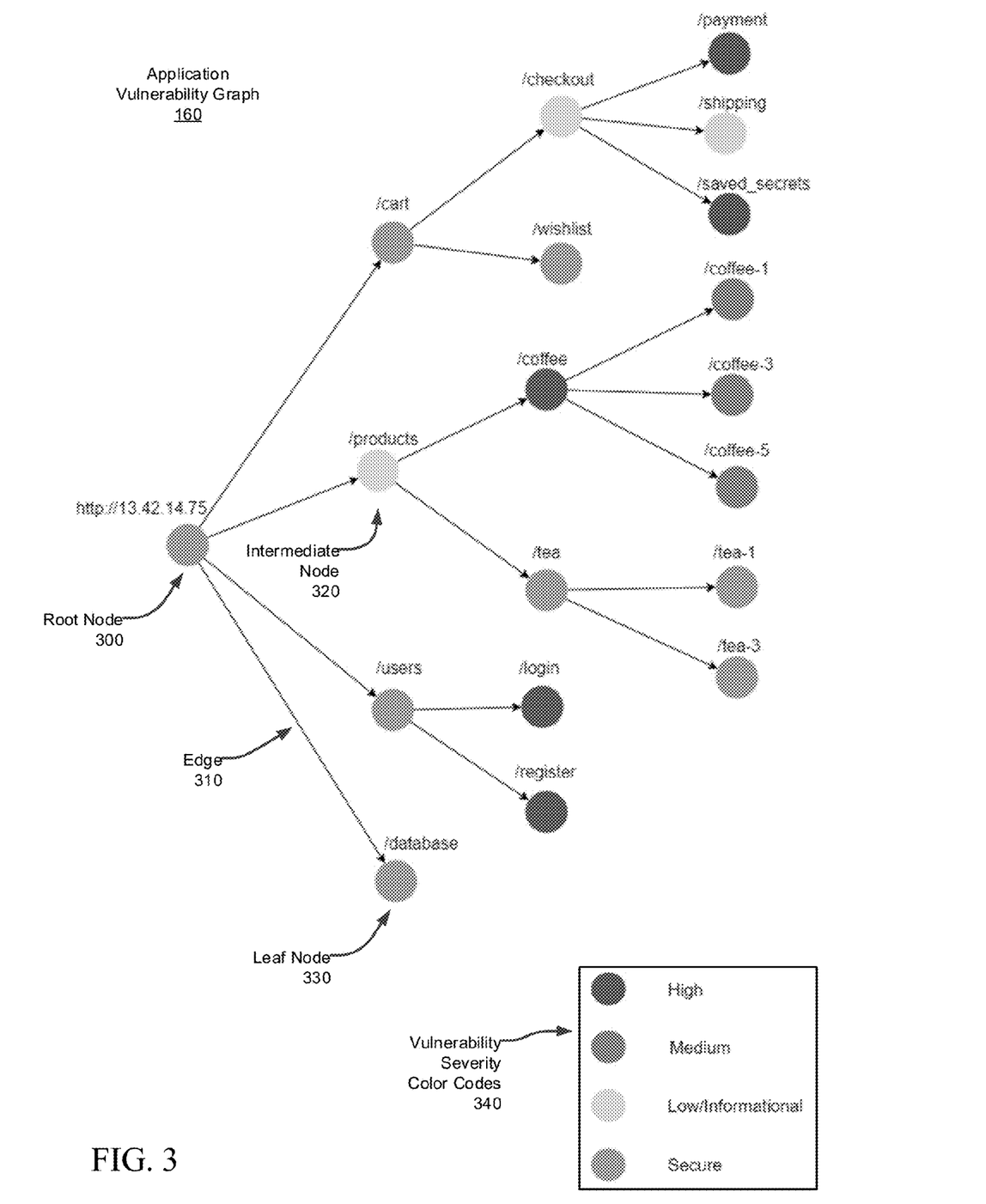
FIG. 3 illustrates an application vulnerability graph, in accordance with an example of the present disclosure.

The vulnerability graph visualizer 150 is configured to generate an application vulnerability graph 160 based on the results of the vulnerability scanner 130 that are provided in the scanner logs 140. One example of a vulnerability graph 160 is shown in FIG. 3 and will be explained below.

The user interaction filtering system 170 is configured to present or display the vulnerability graph 160 through a user interface to allow the user to efficiently visualize the vulnerabilities in the context of the website structure. In some examples, the nodes are color-coded to indicate the severity associated with each vulnerability. The filtering system 170 is further configured to allow the user to filter the vulnerability graph 160 based on selected classes of vulnerabilities and to enable or disable protections as desired through user input 165, as will be explained below.

The web application firewall (WAF) rule and policy generator 180 is configured to generate rules and policies to be applied to the WAF based on the filtered vulnerability graph 175 and the user input 165. In some examples the vulnerability graph 160, or the filter vulnerability graph 175 may also be provided to information technology (IT) administrators 190 or other suitable personnel for review.

FIG. 2 illustrates one example of a vulnerability scanner log 140 of FIG. 1, in accordance with an example of the present disclosure. The scanner log 140 may include any number of entries 200, 210, 220, as shown, and the entries may be coded in any of a number of possible formats. Each log entry describes a single vulnerability associated with a URL. The first entry 200 of FIG. 2 illustrates an example coded in a Java Script Object Notation (JSON) format. The fields of this entry indicate that the detected security vulnerability is associated with structured query language (SQL), and in particular, an error-based SQL injection attack. The entry also indicates that the vulnerability is associated with a login and provides the associated URL as "http://13.42.14.75/users/login.php." Additionally, the severity of the vulnerability is indicated as "high." Scanner log entries 2 through N may describe additional vulnerabilities associated with other URLs branching off that server IP or domain name. In a similar manner, additional scanner logs may be generated for other domains.

FIG. 3 illustrates an example of application vulnerability graph 160, of FIG. 1, in accordance with an example of the present disclosure. The application vulnerability graph 160 may be generated by vulnerability graph visualizer 150 of FIG. 1, based on scanner log 140 of FIG. 1. Vulnerability graph 160 is shown to include a root node 300, intermediate nodes 320 and leaf nodes 330. The nodes are connected by edges 310. Each path from root node to leaf node, through intermediate nodes and connecting edges (i.e., a root to leaf traversal), represents a URL/API. The leaf node in the path represents a vulnerability associated with that URL/API that was captured in the scanner log 140. The intermediate nodes may represent a function (e.g., aggregation or summation) of the vulnerabilities in the associated subtree.

The nodes are color-coded based on vulnerability severity. A color code chart 340 is shown which provides an example mapping of vulnerability severities, ranging from high to medium to low/informational to secure, to the indicated colors ranging from red (for high) to green (for secure).

Root node 300 is shown to represent the server IP "http://13.42.14.75" as specified in the example scanner log 140. A URL path is shown, corresponding to entry 1 of the scanner log 140, which includes the root node "http://13.42.14.75", the intermediate node "/users," and the leaf node "/login." The leaf node is color-coded to indicate a high severity level. The URL path represents a web application, in this case for logging in. Other applications are shown in the graph, for example to checkout, add items to a wishlist, and examine products such as types of coffee and tea.

Figure 4:
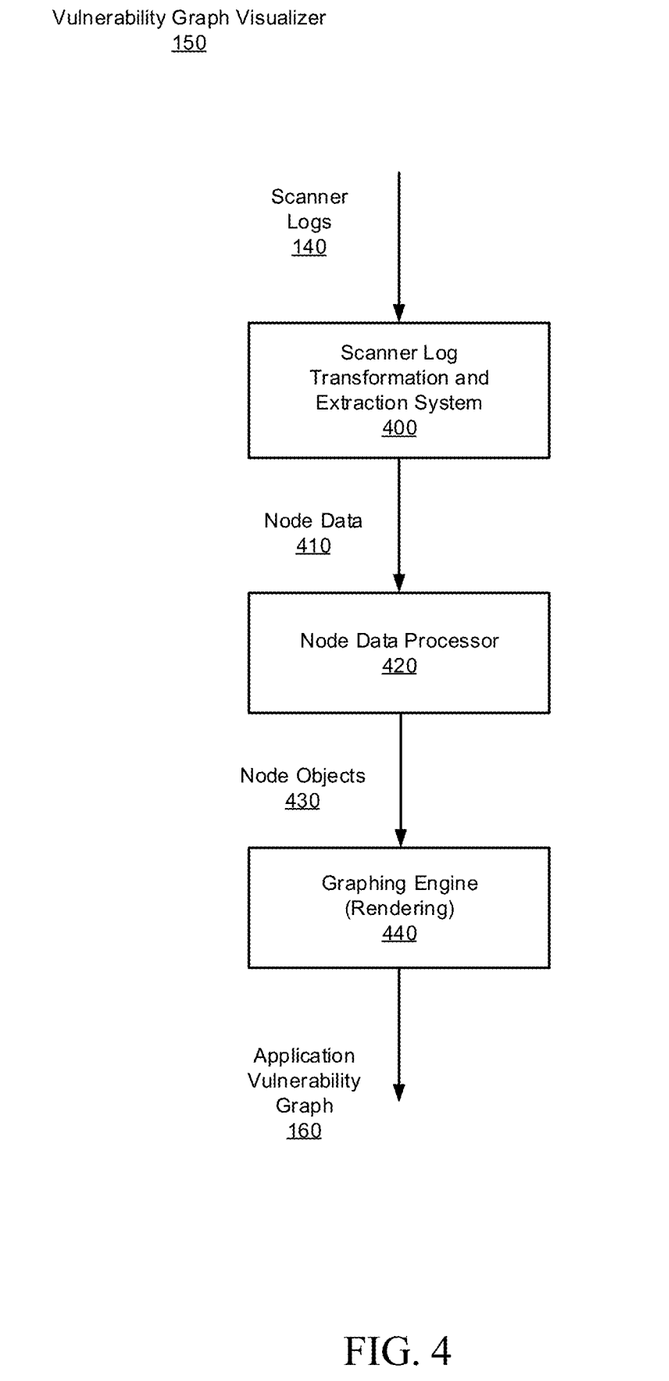
FIG. 4 is a block diagram of a vulnerability graph visualizer, in accordance with an example of the present disclosure.

FIG. 4 is a block diagram of the vulnerability graph visualizer 150 of FIG. 1, in accordance with an example of the present disclosure. The vulnerability graph visualizer 150 is shown to include a scanner log transformation and extraction system 400, a node data processor, 420, and a graphing engine 440.

The scanner log transformation and extraction system 400 is configured to process the entries in the scanner logs 140 of FIG. 1. Because these entries may be provided in any of a number of formats, the scanner log transformation and extraction system 400 first converts the entries into a common format for subsequent processing. The common format may be chosen to be any suitable format that is convenient to work with. The scanner log transformation and extraction system 400, then extract the relevant data and metadata from each entry to be used as node data 410. Using the example of entry 1 from scanner log 140, extracted data/metadata for a node might look like:

```
{
    "nodename":"/login",
    "xss_vulnerable": [ ],
    "sqli_vulnerable": [
        "login",
        "password"
    ],
    "severity": 10,
    "vulnerability_count": 2
}
```

And extracted data/metadata for edges might look like:

```
{
    "source_nodename": "http://13.42.14.75",
    " destination _nodename": "/users"
},
{
    "source_nodename": "/users",
    "destination_nodename": "/login"
}
```

The node data processor 420 is configured to employ the node data 410 to generate node objects 430 which contain all of the relevant data and metadata associated with that node, including the path component, the vulnerability severity, and the vulnerability type or classification. In some examples, a vulnerability score may be calculated for each type of vulnerability using methods such as the Common Vulnerability Scoring System (CVSS), or other suitable methods in light of the present disclosure. In some examples, the vulnerability severity for the node may be calculated as the mean of the scores of all of the vulnerabilities faced by that node, although other methods may be used. The aggregated score can then be used to select the color of the node from any desired range of colors.

The graphing engine 440 is configured to render the application vulnerability graph 160 of FIG. 1, based on the node objects 430. In some examples, the graph 160 is rendered for display on a display element or screen of a user device and may be displayed as part of a user interface that includes control elements, as will be described below.

Figure 5:
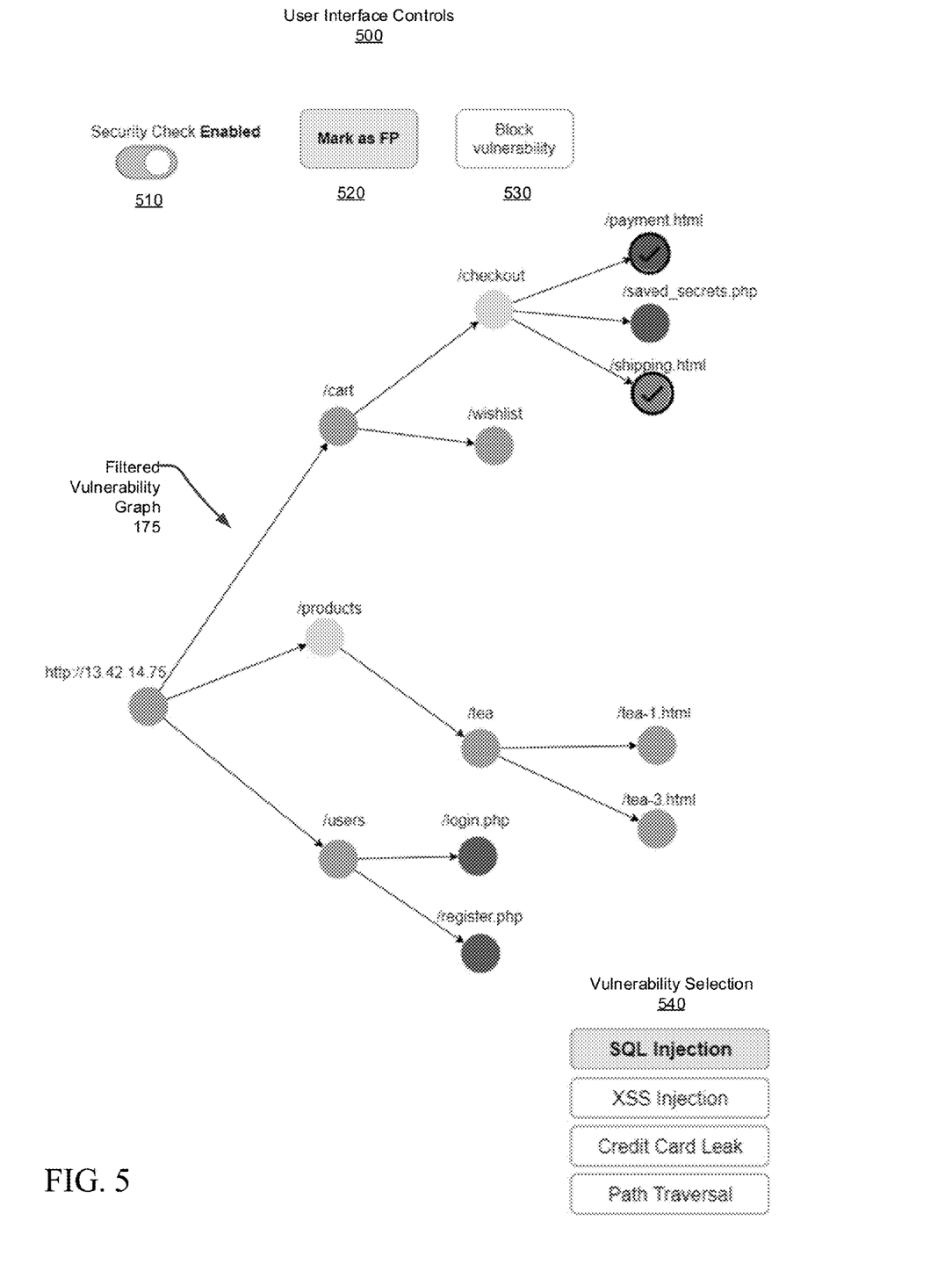
FIG. 5 illustrates user interface controls, in accordance with an example of the present disclosure.

FIG. 5 illustrates user interface controls 500, in accordance with an example of the present disclosure. The filtered vulnerability graph 175 of FIG. 1 is shown along with a security check button 510, a mark as false positive (FP) button 520, a block vulnerability button 530, and a menu of vulnerability selection buttons 540.

The vulnerability selection buttons 540 provide a menu choice of types or classes of vulnerabilities that can be addressed. In this example, four choices are provided as an illustration (SQL injection, Cross-site Scripting injection (XSS) injection, credit card leak, and path traversal), however, any number of types of vulnerabilities may be provided for the user to select. In this example, the SQL injection vulnerability class is selected and the vulnerability graph 175 is filtered to show only vulnerabilities related to SQL injection. If the user toggles the security check button 510 to the enabled position, as shown in this figure, then WAF protection for the selected violation type will be enabled for all nodes.

Additionally, when the security check button 510 is enabled, usage of the mark as FP button 520 is allowed so that, when toggled on as shown in the figure, the user can select nodes to be marked as false positive. In some examples, the user may select nodes as FP by clicking on them with a mouse, or other pointing device. The FP marked nodes are indicated with a check mark in this figure. The user may wish to mark nodes as FP if the user believes that these nodes have been incorrectly flagged as being vulnerable (within the selected vulnerability class) by the vulnerability scanner 130 of FIG. 1. Relaxation rules will be generated by the WAF rule and policy generator 180 of FIG. 1 for nodes that are marked as FP, to disable protection against the selected vulnerability for those nodes.

In some examples, when the security check button 510 is in the enabled position, the block vulnerability button 530 is unused or disabled.

Figure 6:
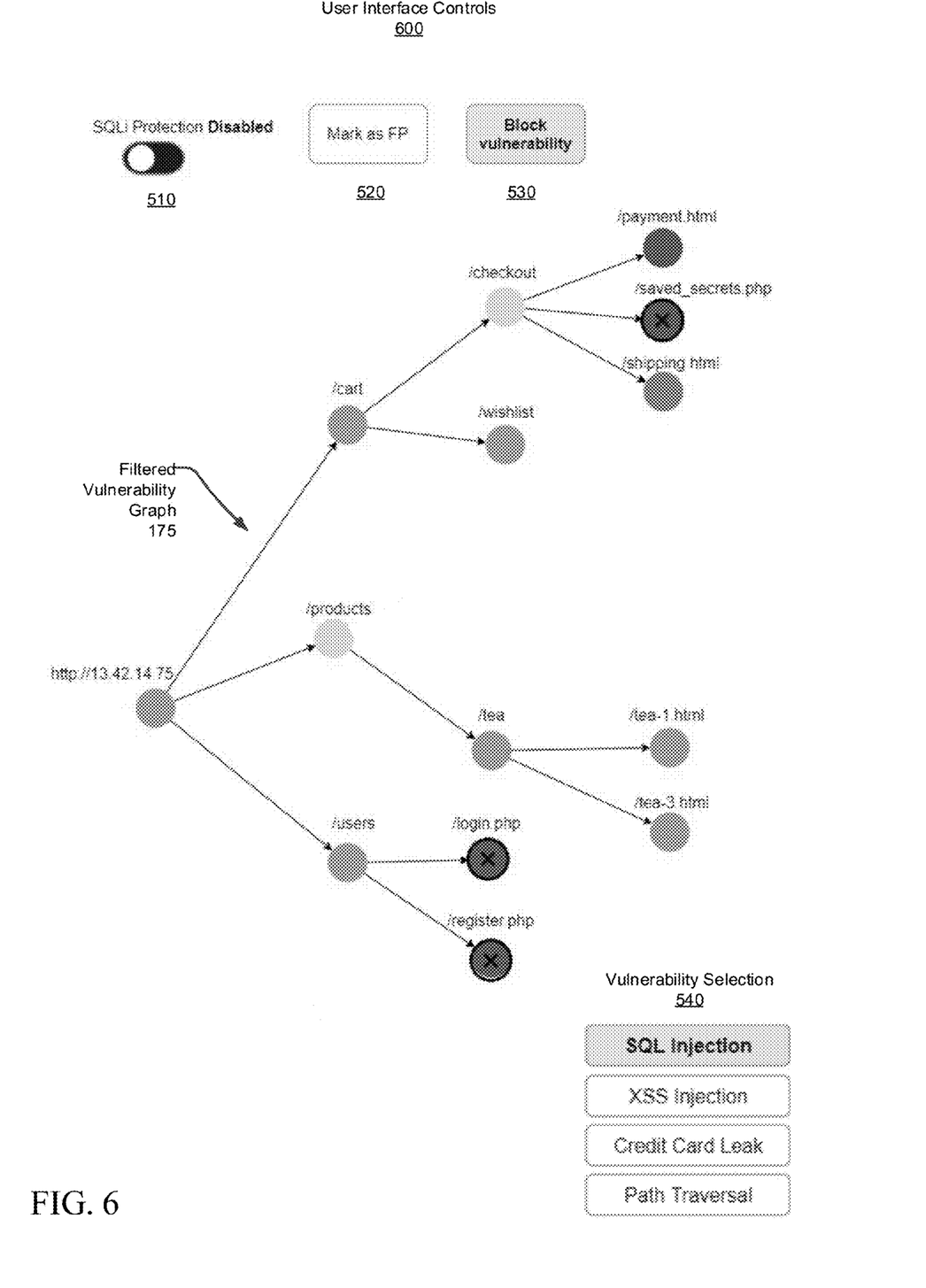
FIG. 6 illustrates additional examples of user interface control manipulation, in accordance with an example of the present disclosure.

FIG. 6 illustrates additional examples of user interface control manipulation 600, in accordance with an example of the present disclosure. In this example, the security check enabled button 510 of FIG. 5 is toggled such that the selected vulnerability, SQL injection (or SQLi), is disabled. In this state all nodes default to having disabled vulnerability protection. Under this condition, the block vulnerability button 530 of FIG. 5 is enabled, and when toggled on as shown in the figure, the user can explicitly select individual nodes for which the selected vulnerability should be blocked. In some examples, the user may select nodes for vulnerability blocking by clicking on them with a mouse, or other pointing device. Such nodes are indicated by a cross mark (e.g., an X) in the figure. Security rules or signatures will be generated by the WAF rule and policy generator 180 of FIG. 1 for nodes that are so marked, to enable protection against the selected vulnerability for those nodes.

In some examples, signatures and relaxation rules may comprise regular expression (regex) character strings for matching, in which the regex is generated from the URLs of the selected nodes. For example, a regex that matches to both the wishlist node and the checkout node, both under the cart node, may be generated as "http://13.42.14.75/cart/*". Use of the "*" matching character helps to reduce the number of regex's that are generated. For example, when all the nodes of a subtree are selected, a common regex is generated for each subtree and a single rule is applicable for all the nodes in that subtree. Additionally, when subtrees are not completely selected, the complexity of the regex may be reduced by avoiding combinations of the nodes to refrain from generating a complicated regex that would require more processing time.

Figure 7:
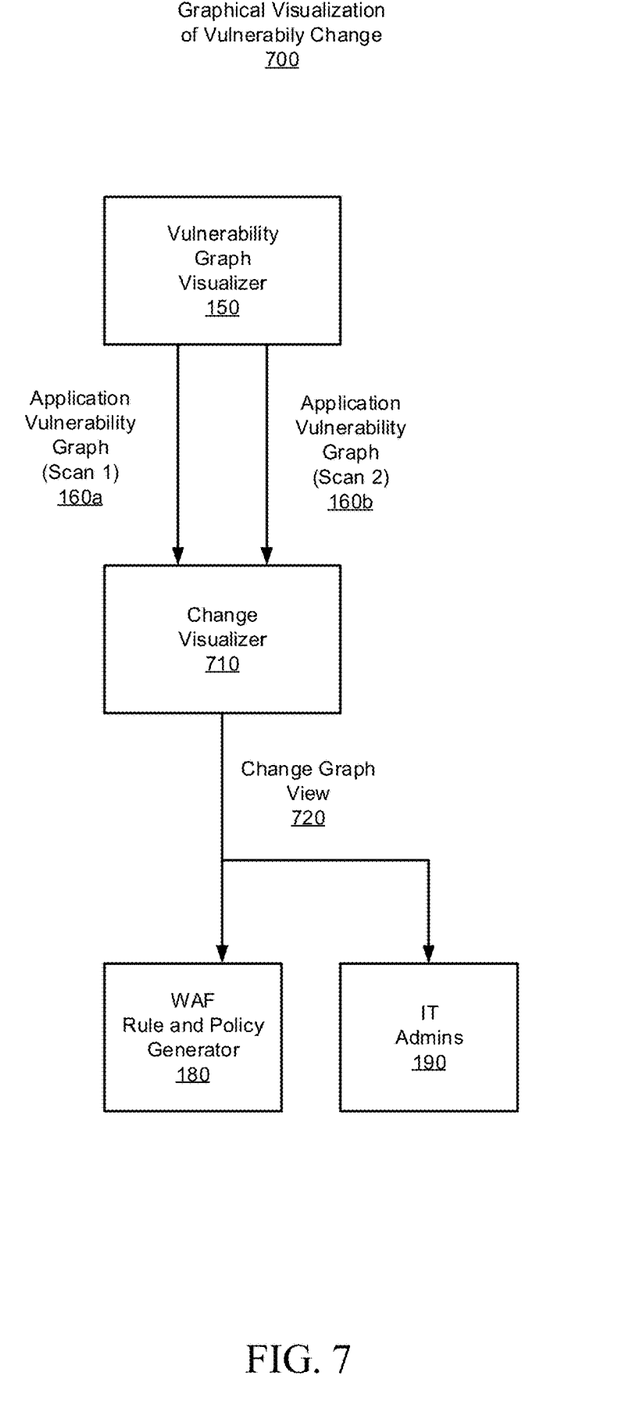
FIG. 7 is a block diagram of a system for providing graphical visualization of web site vulnerability changes, in accordance with an example of the present disclosure.

FIG. 7 is a block diagram of a system 700 for providing graphical visualization of web site vulnerability changes, in accordance with an example of the present disclosure. In some examples, vulnerability scanning may be performed at regular intervals and the differences in graphs resulting from two or more scans can be used to visualize changes in the servers and web applications. System 700 is shown to include the vulnerability graph visualizer 150 of FIG. 1, a change visualizer 710, and the WAF rule and policy generator 180 of FIG. 1.

The vulnerability graph visualizer 150 may generate a first application vulnerability graph for a first scan 160*a* and a second application vulnerability graph for a second scan 160*b*. The change visualizer 710 is configured to generate or render a change graph view 720, which highlights the differences that have been detected between the two scans.

In some examples, configurations (e.g., signatures and relaxation rules) that were generated for nodes which have disappeared in the new scan may be removed. In some examples, the change graph view 720 may apply the severity color codes to only those nodes that have been newly added.

In some examples, the change graph view 720 may highlight nodes for which new vulnerabilities have appeared or for which vulnerability severities have increased. The severity color codes may be applied to only those nodes that have changed, while unchanged nodes may be represented by a unique color for easy visual distinction.

In some examples, the change graph view 720 may be used by WAF rule and policy generator 180 to add additional WAF configurations if WAF protection is enabled. The change graph view 720 may also be used to provide alerts to IT administrators 190 of FIG. 1.

Figure 8:
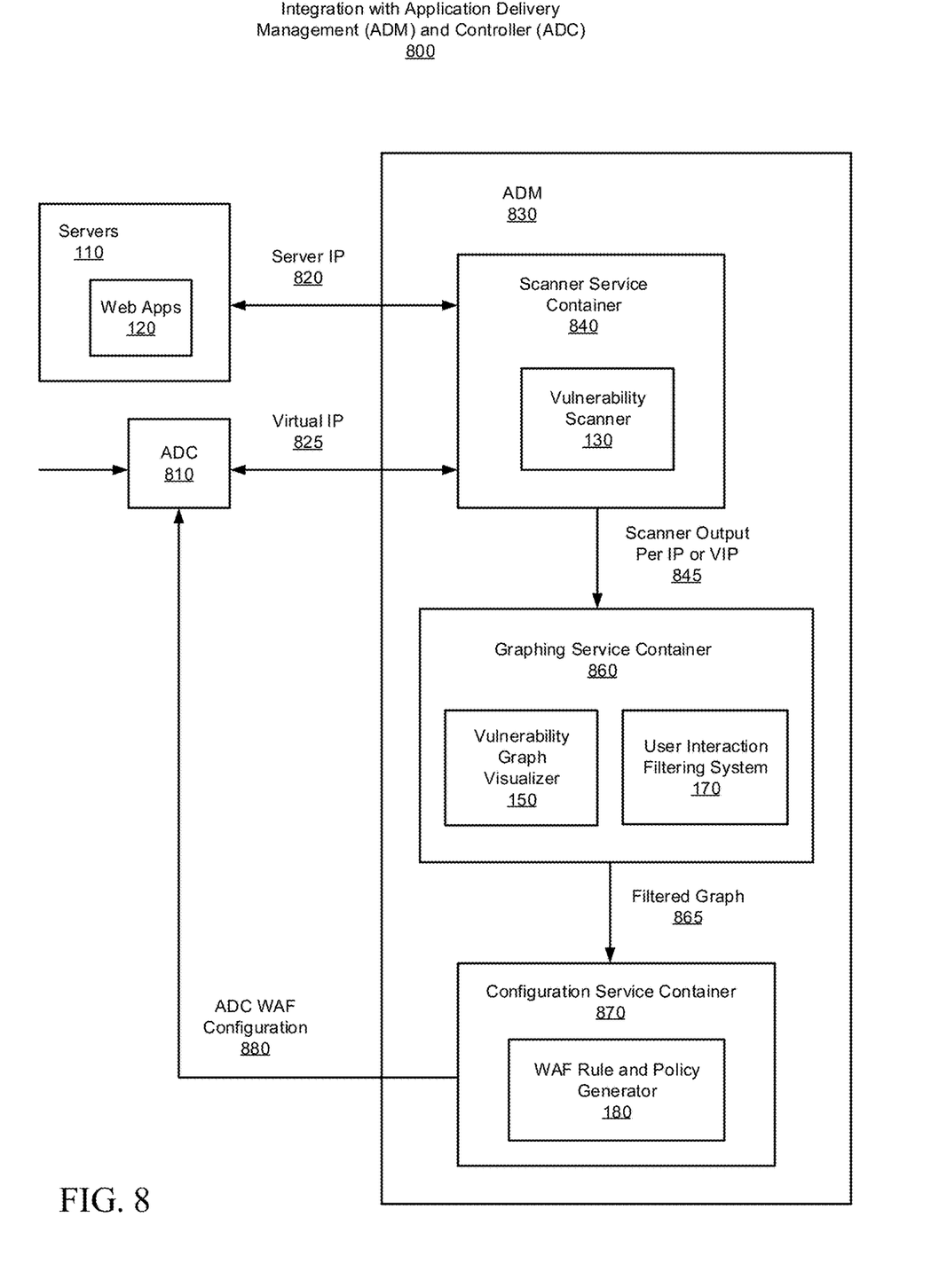
FIG. 8 is a block diagram of the system for providing graphical visualization of web site vulnerabilities integrated in an application delivery management service, in accordance with an example of the present disclosure.

FIG. 8 is a block diagram of an integration 800 of the system 100 of FIG. 1 for providing graphical visualization of web site vulnerabilities, with an application delivery management service 830, in accordance with an example of the present disclosure. The application delivery management service 830 is shown to include a scanner service container 840, a graphing service container 860, and a configuration service container 870. An application delivery controller 810 is also shown in this figure. In some examples, the vulnerability scanner 130, vulnerability graph visualizer 150, user interface filtering system 170, and WAF rule and policy generator 180, all of FIG. 1, are provided as services or micro-services to execute within the containers listed above and shown in this figure.

The web application vulnerability scanner 130 running on ADM 830 can be used to scan the web applications 120 of FIG. 1 executing on servers 110 of FIG. 1, or the ADC 810 itself. In some examples, data from each server 110 may be associated with a server IP 820 and data from the ADC may be associated with a virtual IP 825. The output of the scanner is used to determine the hierarchical structure in the URL/APIs of the web applications 120, as previously described. The output 845 of the scanner, which may be provided for each IP or VIP, is then processed by the vulnerability graph visualizer 150 to render a graph in which each node represents the vulnerability status of a URL/API. The user interaction filtering system 170 allows the user to filter the vulnerability graph based on selected classes of vulnerabilities and to enable or disable protections as desired. The WAF rule and policy generator 180 then generates rules and policies based on the filtered graph 865 and provides these to the ADC 810 as configuration data 880.

Visualization Process

As described above, some examples of the system 100 of FIG. 1 are configured to perform a process for providing graphical visualization of web site vulnerabilities for use in configuring protection policies. The processes may be executed on a processor of any suitable type (e.g., processor 1010 of FIG. 10).

Figure 9:
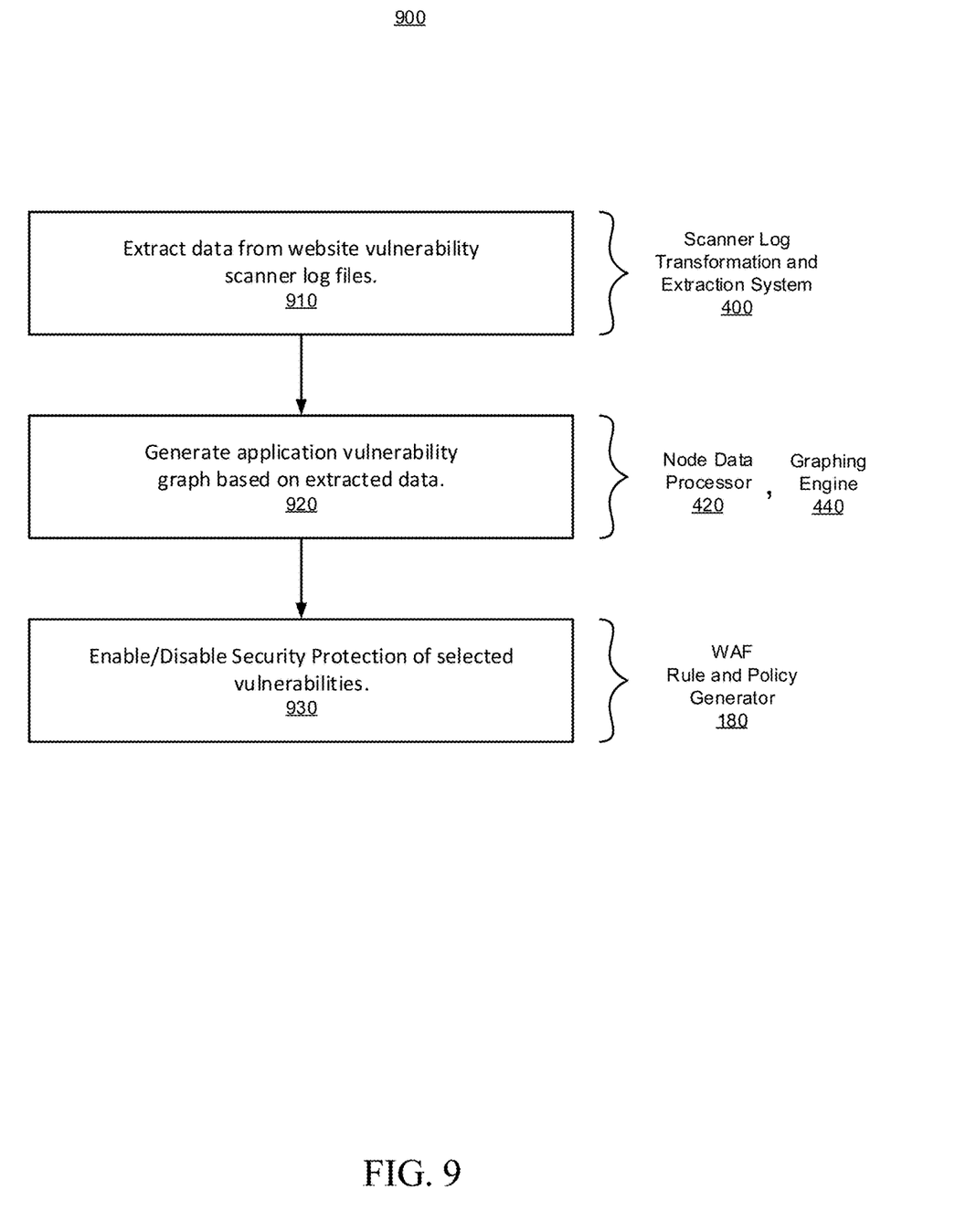
FIG. 9 is a flow diagram of a process for providing graphical visualization of web site vulnerabilities for use in configuring protection policies, in accordance with an example of the present disclosure.

FIG. 9 is a flow diagram 900 of a process for providing graphical visualization of web site vulnerabilities for use in configuring protection policies, executed by any combination of the system elements/components 130, 150, 170, 180, of FIG. 1, and 710 of FIG. 7, or the sub-components thereof, in accordance with an example of the present disclosure.

The process 900 starts with extracting, at operation 910, data from website vulnerability scanner logs or output. In some examples, the data includes URLs, vulnerability scores associated with the URLs, and vulnerability classifications associated with the URLs.

Next, at operation 920, an application vulnerability graph is generated based on the extracted data. In some examples, the application vulnerability graph is comprised of nodes that are connected by edges. Each node is associated with a field of the URL and the nodes are labeled to indicate the associated field of the URL. The nodes are also color coded based on the vulnerability score, and the nodes are associated with the vulnerability classification. In some examples, the vulnerability classifications may include one or more of SQL injection vulnerability, XSS injection vulnerability, credit card leak vulnerability, and path traversal vulnerability.

At operation 930, security protections are enabled or disabled for nodes and vulnerability classifications from the vulnerability graph. In some examples, and as previously described, relaxation rules can be applied when security protection is enabled, and signature rules can be applied when security protection is disabled.

In some examples, nodes of the application vulnerability graph may be filtered based on a match between a user-selected vulnerability classification and the vulnerability classification associated with the nodes.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Figure 10:
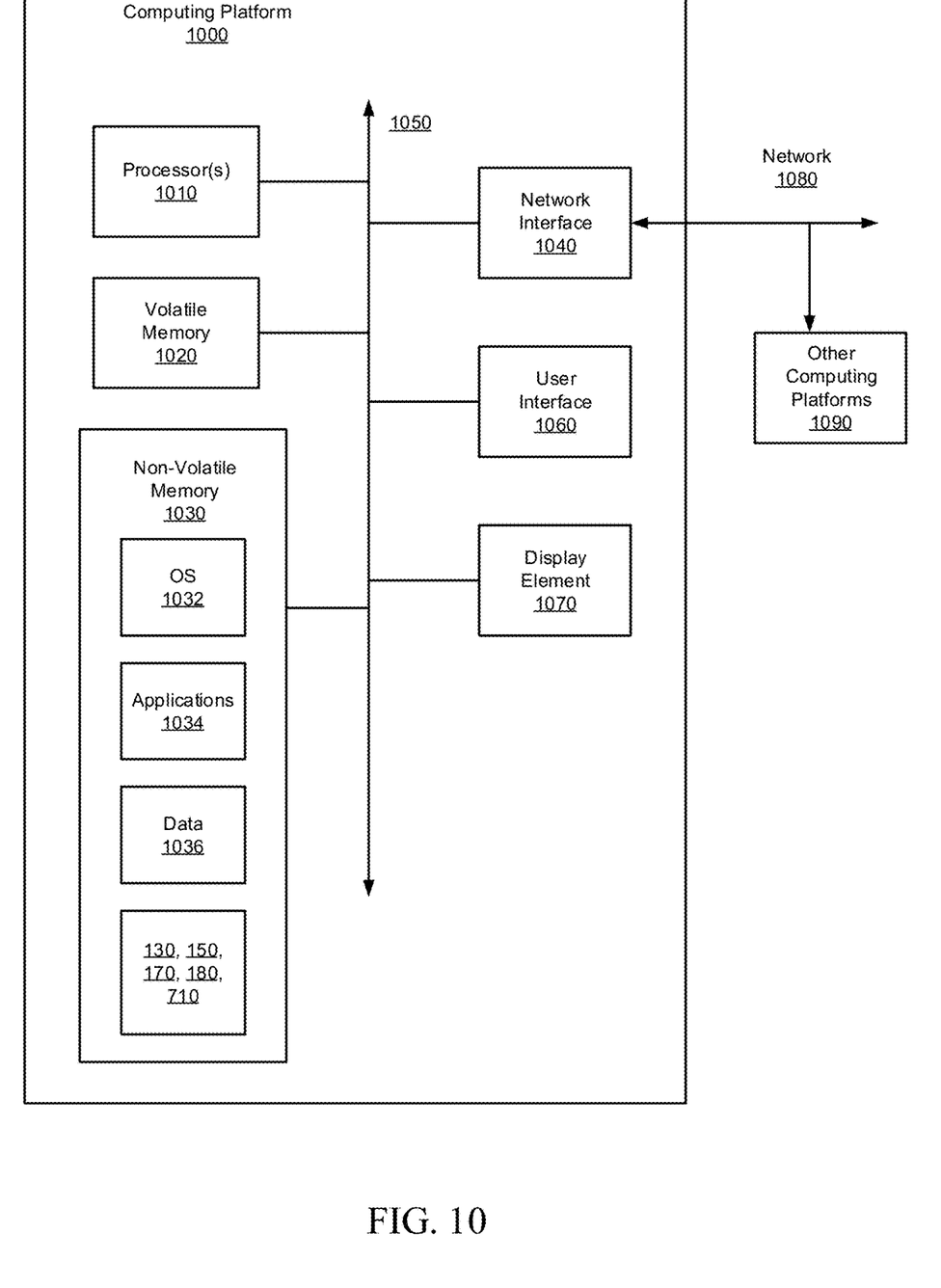
FIG. 10 is a block diagram of a computing platform configured to perform a process for providing graphical visualization of web site vulnerabilities for use in configuring protection policies, in accordance with an example of the present disclosure.

Computing Platform for Graphical Visualization of Web Application Vulnerabilities FIG. 10 is a block diagram of a computing platform 1000 configured to perform a process for providing graphical visualization of web site vulnerabilities for use in configuring protection policies, in accordance with an example of the present disclosure. In some cases, the platform 1000 may be a workstation, server, laptop, mobile device, or smartphone.

The computing platform or device 1000 includes one or more processors 1010, volatile memory 1020 (e.g., random access memory (RAM)), non-volatile memory 1030, one or more network or communication interfaces 1040, user interface (UI) 1060, display element (e.g., screen) 1070, and a communications bus 1050. The computing platform 1000 may also be referred to as a computer or a computer system.

The non-volatile (non-transitory) memory 1030 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1060 can include one or more input/output (I/O) devices (e.g., a mouse, a keyboard, a microphone, one or more speakers, one or more biometric scanners, one or more environmental sensors, and one or more accelerometers, etc.).

The display element 1070, can provide a graphical user interface (GUI) and in some cases, may be a touchscreen or any other suitable display device.

The non-volatile memory 1030 stores an operating system 1032, one or more applications 1034, data 1036, and system elements 130, 150, 170, 180 of FIG. 1, and system element 710 of FIG. 7, such that, for example, computer instructions of the operating system 1032, the applications 1034, and the system elements 130, 150, 170, 180, and 710, are executed by processor(s) 1010 out of the volatile memory 1020. In some examples, the volatile memory 1020 can include one or more types of RAM and/or a cache memory that can offer a faster response time than a main memory. Data can be entered through the user interface 1060. Various elements of the computer 1000 can communicate via the communications bus 1050.

The illustrated computing platform 1000 is shown merely as an example client device or server and can be implemented by any computing or processing environment with any type of machine or set of machines that can have suitable hardware and/or software capable of operating as described herein.

The processor(s) 1010 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1010 can be analog, digital, or mixed. In some examples, the processor 1010 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 1040 can include one or more interfaces to enable the computing platform 1000 to access a computer network 1080 such as a Local Area Network (LAN), a Wide Area Network (WAN), a Personal Area Network (PAN), or the Internet through a variety of wired and/or wireless connections, including cellular connections. In some examples, the network 1080 may allow for communication with other computing platforms 1090, to enable distributed computing.

In described examples, the computing platform 1000 can execute an application on behalf of a user of a client device. For example, the computing platform 1000 can execute one or more virtual machines managed by a hypervisor. Each virtual machine can provide an execution session within which applications execute on behalf of a user or a client device, such as a hosted desktop session. The computing platform 1000 can also execute a terminal services session to provide a hosted desktop environment. The computing platform 1000 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory; and
at least one processor coupled to the memory and configured to:
extract, from a website vulnerability scanner log file, a uniform resource locator (URL), a vulnerability score associated with the URL, and a vulnerability classification associated with the URL;
generate an application vulnerability graph comprising nodes connected by edges, wherein one or more of the nodes are associated with an application programming interface (API), the API associated with a field of the URL, the nodes are labeled to indicate the associated field of the URL, the nodes are color coded based on the vulnerability score, and the nodes are associated with the vulnerability classification;
filter nodes of the application vulnerability graph based on a match between a user-selected vulnerability classification and the vulnerability classification associated with the nodes; and
enable or disable security protection against the user-selected vulnerability classification of the nodes.

2. The computer system of claim 1, wherein the vulnerability classification comprises one or more of a Structured Query Language injection vulnerability, a Cross-site Scripting injection vulnerability, a credit card leak vulnerability, and a path traversal vulnerability.

3. The computer system of claim 1, wherein the at least one processor is further configured to generate web application firewall security rules and/or web application firewall relaxation rules for application to one or more user-selected nodes.

4. The computer system of claim 3, wherein the web application firewall security rules and the web application firewall relaxation rules are generated as regular expressions based on the URL.

5. The computer system of claim 1, wherein the at least one processor is further configured to:
generate a first application vulnerability graph based on a first website vulnerability scanner log file provided at a first time;
generate a second application vulnerability graph based on a second website vulnerability scanner log file provided at a second time; and
render a visualization of differences between the first application vulnerability graph and the second application vulnerability graph.

6. A method for graphical visualization of web application vulnerabilities comprising:
extracting, by a computer system, from a website vulnerability scanner log file, a uniform resource locator (URL), a vulnerability score associated with the URL, and a vulnerability classification associated with the URL;
generating, by the computer system, an application vulnerability graph comprising nodes connected by edges, wherein one or more of the nodes are associated with an application programming interface (API), the API associated with a field of the URL, the nodes are labeled to indicate the associated field of the URL, the nodes are color coded based on the vulnerability score, and the nodes are associated with the vulnerability classification;
filtering, by the computer system, nodes of the application vulnerability graph based on a match between a user-selected vulnerability classification and the vulnerability classification associated with the nodes; and
enabling or disabling, by the computer system, security protection against the user-selected vulnerability classification of a user-selected node.

7. The method of claim 6, wherein the vulnerability classification comprises one or more of a Structured Query Language injection vulnerability, a Cross-site Scripting injection vulnerability, a credit card leak vulnerability, and a path traversal vulnerability.

8. The method of claim 6, further comprising generating web application firewall security rules and/or web application firewall relaxation rules for application to one or more user-selected nodes.

9. The method of claim 8, wherein the web application firewall security rules and the web application firewall relaxation rules are generated as regular expressions based on the URL.

10. The method of claim 6, further comprising:
generating a first application vulnerability graph based on a first website vulnerability scanner log file provided at a first time;
generating a second application vulnerability graph based on a second website vulnerability scanner log file provided at a second time; and
rendering a visualization of differences between the first application vulnerability graph and the second application vulnerability graph.

11. A non-transitory computer readable medium storing executable sequences of instructions to provide graphical visualization of web application vulnerabilities, the sequences of instructions comprising instructions to:
extract, from a website vulnerability scanner log file, a uniform resource locator (URL), a vulnerability score associated with the URL, and a vulnerability classification associated with the URL;
generate an application vulnerability graph comprising nodes connected by edges, wherein one or more of the nodes are associated with an application programming interface (API), the API associated with a field of the URL, the nodes are labeled to indicate the associated field of the URL, the nodes are color coded based on the vulnerability score, and the nodes are associated with the vulnerability classification;
filter nodes of the application vulnerability graph based on a match between a user-selected vulnerability classification and the vulnerability classification associated with the nodes; and
enable or disable security protection against the user-selected vulnerability classification of a user-selected node.

12. The computer readable medium of claim 11, wherein the vulnerability classification comprises one or more of a Structured Query Language injection vulnerability, a Cross-site Scripting injection vulnerability, a credit card leak vulnerability, and a path traversal vulnerability.

13. The computer readable medium of claim 11, wherein the sequences of instructions further include instructions to generate web application firewall security rules and/or web application firewall relaxation rules for application to one or more user-selected nodes.

14. The computer readable medium of claim 13, wherein the web application firewall security rules and the web application firewall relaxation rules are generated as regular expressions based on the URL.

15. The computer readable medium of claim 11, wherein the sequences of instructions further include instructions to:
generate a first application vulnerability graph based on a first website vulnerability scanner log file provided at a first time;
generate a second application vulnerability graph based on a second website vulnerability scanner log file provided at a second time; and
render a visualization of differences between the first application vulnerability graph and the second application vulnerability graph.

* * * * *